UNITED STATES PATENT OFFICE 2,692,269

PREPARATION OF ESTERS OF NUCLEAR-SUBSTITUTED CINNAMYL ALCOHOLS

Charles F. H. Allen and John R. Byers, Jr., Rochester, N. Y., assignors to Eastman Kodak Company, Rochester, N. Y., a corporation of New Jersey No Drawing. Original application January 17, 1948, Serial No. 2,968. Divided and this application February 23, 1951, Serial No. 212,512

24 Claims. (Cl. 260—340.5)

This application is a division of an application entitled "Preparation of Nuclear-substituted Cinnamyl Alcohols," Serial No. 2,968, filed January 17, 1948, now Patent No. 2,545,439 dated March 20, 1951. The invention of the present application relates to the preparation of esters of nuclear-substituted cinnamyl alcohols by the selective reduction of esters of nuclear-substituted cinnamic acids.

An exemplary cinnamyl alcohol is coniferyl alcohol which occurs in nature as the glucoside, coniferin, which can be obtained from the cambial juice of conifers. Tiemann and Haarmann, "Berichte," vol. 7 (1871), page 608, disclose the preparation of coniferyl alcohol by fermentation of the cambial juice, which they obtained from conifers, using the enzyme, emulsin, as the active splitting agent. Later it was suggested that the coniferyl alcohol may occur as the benzoate; Perf. and Ess. Oil Rec. 34 (1934), page 341. Thus, it is clear that nuclear-substituted cinnamyl alcohols such as coniferyl alcohol have not been prepared synthetically and are available only in limited quantities since they are derived from natural sources with great difficulty. It is apparent that the esters of these alcohols are equally if not more difficult to prepare.

According to an article by R. F. Nystrom and W. G. Brown, "Journ. Amer. Chem. Soc." 69 (1947), page 2548, they clearly teach that cinnamic acid undergoes concurrent reduction at the double bond of the nuclear substituent whereby hydrocinnamyl alcohol is obtained when using lithium aluminum hydride as the reducing agent. According to Nystrom et al., it appears to be characteristic of the reagent that ethylenic carbon chains, substituted on one side by a phenyl group and on the other by a reducible group (carboxyl, carbonyl, etc.) are hydrogenated.

Contrary to the teachings of the above-mentioned prior art, the applicants have now found that nuclear-substituted cinnamyl alcohols, e. g. coniferyl alcohol, and esters of such alcohols can be prepared synthetically using readily-available materials employing lithium aluminum hydride as the reducing agent.

The preparation of nuclear-substituted cinnamyl alcohols has been covered by our parent application. It is, accordingly, an object of our instant invention to provide a process for preparing esters of nuclear-substituted cinnamyl alcohols. Other objects will become apparent from a consideration of the following description:

According to the process of our invention, we selectively reduce a nuclear-substituted cinnamic acid ester to the corresponding nuclear-substituted cinnamyl alcohol by reacting the nuclear-substituted cinnamic acid ester with lithium aluminum hydride, a reducing agent whose formula can be illustrated as:

$$LiAlH_4$$

According to the process of our invention we can then prepare an ester of the nuclear-substituted cinnamyl alcohol without isolating the alcohol from the reaction mixture resulting from the selective reduction.

It is known that lithium aluminum hydride reduces cinnamic acid to hydrocinnamyl alcohol (Nystrom and Brown, cited above); however, quite unexpectedly, we have now found that when nuclear-substituted cinnamic acid esters are reduced with this new reagent, the carbonyl group is preferentially reduced, and the carbon-to-carbon double bond in the side-chain is not attacked. While Nystrom and Brown have taught that it is characteristic of lithium aluminum hydride, that compounds containing olefinic groups, substituted on one end by a phenyl nucleus and on the other by a reducible group, are reduced not only at this reducible group but also at the olefinic bond, we have found (as indicated above) that esters of nuclear-substituted cinnamic acids do not follow this expected trend, but are reduced to the corresponding nuclear-substituted cinnamyl alcohols instead.

The nuclear-substituted cinnamic acid esters which we can advantageously employ in practicing our invention can be represented by the following two formulas:

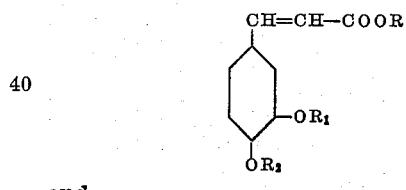

and

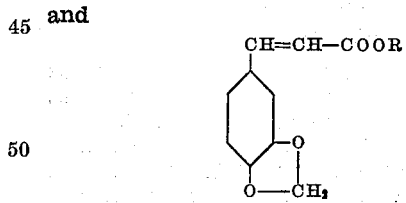

wherein R represents an alkyl group, such as methyl, ethyl, propyl, isopropyl, n-butyl, isobutyl, etc. (e. g. an alkyl group having the formula $C_nH_{2n+1}$ wherein $n$ is a positive integer from 1 to 4), and $R_1$ and $R_2$ each represents a member selected from the group consisting of a methyl group, an ethyl group, and an acetyl group. Typical esters include methyl acetyl ferulate, ethyl acetyl ferulate, n-butyl acetyl ferulate, methyl 3,4-dimethoxycinnamate, ethyl 3,4-dimethoxycinnamate, methyl 3,4-diacetoxycinnamate, methyl 3,4-methylenedioxycinnamate, 3,4-methylenedioxycinnamate, etc.

When lithium aluminum hydride reduces the nuclear-substituted cinnamic acid esters in accordance with the process of our invention, the reaction can be illustrated as follows:

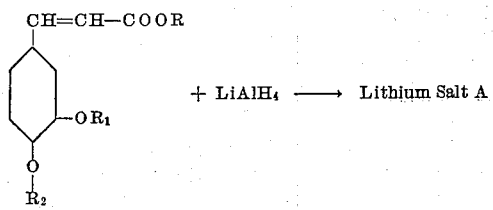

wherein R, $R_1$, and $R_2$ have the definitions set forth above. The exact structure of these lithium salts has not been determined; however, present evidence indicates that a complex alcoholate of lithium and aluminum is formed. These lithium salts can then be used directly in the preparation of other organic compounds (e. g. carboxylic acid esters), or the nuclear-substituted cinnamyl alcohols can be obtained by treating lithium salt A with an aqueous solution of boric acid, disodium phosphate, ammonium chloride, ammonium sulfate, etc. Alternatively, the nuclear-substituted cinnamyl alcohol can be obtained by treating lithium salt A with water to give precipitate of a complex alcoholate of lithium, which can be designated lithium salt B. When an aqueous suspension of this lithium salt B is treated with a weak, inorganic, gaseous anhydride (e. g. carbon dioxide), the nuclear-substituted cinnamyl alcohol is obtained.

It has been found further that when this lithium salt B is treated with the anhydride of an organic carboxylic acid, an ester of the nuclear-substituted cinnamyl alcohol is formed. Organic carboxylic acid anhydrides which can be used in practicing our invention can be represented by the formula:

$$(R_3-CO)_2O$$

wherein $R_3$ represents a member selected from the group consisting of an alkyl group, such as methyl, ethyl, n-propyl, isopropyl, etc. (e. g. an alkyl group having the formula $C_nH_{2n+1}$ wherein $n$ is a positive integer from 1 to 3), an aryl group, such as a phenyl ($C_6H_5$) group, etc., and an aralkyl group, such as phenylmethyl ($C_6H_5CH_2-$) group, etc. Typical carboxylic acid anhydrides include: acetic anhydride, propionic anhydride, n-butyric anhydride, isobutyric anhydride, benzoic anhydride, phenylacetic anhydride, etc.

THE CATALYST

*Example I*

The catalyst can be prepared according to the method of Finholt, Bond, and Schlesinger, Jour. Am. Chem. Soc., vol. 69 (1947), page 1200.

60 gms. (7.5 moles) of lithium hydride of rather large particle size were placed in the jar of a pebble mill under an atmosphere of dry, carbon dioxide-free nitrogen, and ground for 18 hours. At the end of this time the lithium hydride had been ground uniformly to less than 100-mesh particle size. While working under an atmosphere of nitrogen, the pebbles of finely ground lithium hydride were poured onto a screen over a 3-liter beaker. The lithium hydride was washed into the beaker by means of 100 ml. of anhydrous ether. The contents of the beaker were washed with another 100 ml. of anhydrous ether into a 2-liter three-necked flask equipped with stirrer, coil condenser, and dropping funnel, all of which had been swept free of air with nitrogen. Twenty (20) ml. of lithium aluminum hydride solution containing 0.85 gm. (0.025 mole) of lithium aluminum hydride obtained from a previous preparation were added to the lithium hydride slurry and the mixture stirred for 30 minutes. (This lithium aluminum hydride solution lowered the induction time for the reaction and prevented a too violent release of energy.) A solution of 200 gms. (1.5 moles) of aluminum chloride in 1 liter of anhydrous ether was prepared by dissolving the aluminum chloride in the ether while the temperature of the contents of the vessel was maintained at 10° C. This solution was then added to the contents of the three-necked flask at such a rate as to maintain a good reflux of the ether. The time required for the addition was approximately 4 hours. After all the aluminum chloride solution had been added, and the reaction had been completed, the lithium chloride formed and the unreacted lithium hydride were removed by suction on a funnel. The solid was then washed once with 200 ml. of anhydrous ether, and the solution containing the lithium aluminum hydride placed in a stoppered flask in a refrigerator so that aliquots could be taken from time to time for running reduction reactions. The solid remaining behind on the suction funnel was deactivated by adding it portionwise to ethanol. The over-all reaction which took place can be illustrated by the equation:

$$4LiH + AlCl_3 \xrightarrow{ether} LiAlH_4 + 3LiCl$$

Although we generally prepare our nuclear-substituted cinnamyl alcohols from known esters of nuclear-substituted cinnamic acids, in the preparation of coniferyl alcohol, some of the esters which we can employ have not been previously described in the literature. A description of how such esters can be prepared is contained in the specification of the above-mentioned copending application, Serial No. 2,968, now Patent Number 2,545,439, of which the application is a division.

The following example will illustrate the manner in which we reduce one of these esters of a nuclear-substituted cinnamic acid with lithium aluminum hydride:

*Example II.—Coniferyl alcohol (3-methoxy-4-hydroxy-cinnamyl alcohol)*

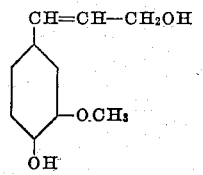

A solution of 8 parts of ethyl 3-methoxy-4-acetoxycinnamate in 50 parts of anhydrous ethyl ether was placed in a dry apparatus, protected from moisture, and which had been flushed with dry, carbon dioxide-free nitrogen. A molecular equivalent of the ethereal solution of lithium aluminum hydride prepared in Example I was added, dropwise, with stirring. A very vigorous reaction took place, and a yellow precipitate formed from the boiling ether. Upon standing for a few minutes the yellow precipitate became white. After the addition of the lithium aluminum hydride was complete, and the reaction had subsided, a solution of 10.5 parts of ammonium sulfate in 20 parts of water was admitted over a half-hour period. The solid precipitate became pasty and tan-colored.

The ether layer was separated and the solid triturated with 50 parts of ether. The solvent was distilled from the combined ethereal solutions, leaving 6.5 parts of a straw-colored oil. This residue was distilled in vacuo and 5 parts of coniferyl alcohol boiling at 163–165° C./3 mm. was obtained. This represented a yield of 73.7%. Although coniferyl alcohol proved difficult to crystallize, crystals were obtained from ether having a melting point of 72–73° C. wheras the literature reports a melting point of 73–74° C.

| Analysis | Calculated | Found |
|---|---|---|
| C | 66.6 | 66.0 |
| H | 6.66 | 6.5 |

By substituting molecularly equivalent amounts of other nuclear-substituted cinnamic acid esters in the above example, still other nuclear-substituted cinnamyl alcohols can be prepared. For example, when a molecularly equivalent amount of methyl 3,4-dimethoxycinnamate is substituted for the ethyl 3-methoxy-4-acetoxycinnamate, 3,4-dimethoxycinnamyl alcohol represented by the formula:

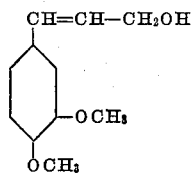

can be obtained. Similarly, when a molecularly equivalent amount of methyl 3,4-diacetoxycinnamate replaces the ethyl 3-methoxy-4-acetoxycinnamate of the above example, 3,4-dihydroxycinnamyl alcohol represented by the formula:

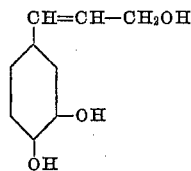

can be obtained. In a like manner, when ethyl 3,4-methylenedioxycinnamate replaces the ethyl 3-methoxy-4-acetoxycinnamate of Example II, 3,4-methylenedioxycinnamyl alcohol having the formula:

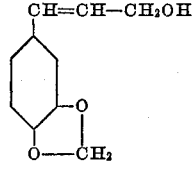

can be obtained.

When isovanillin is reacted with sodium acetate and acetic anhydride and the acid obtained thereby is esterified with ethyl alcohol according to the method set forth in the parent application referred to above, followed by reduction of the ester according to the method of Example II, 3-hydroxy-4-methoxycinnamyl alcohol having the formula:

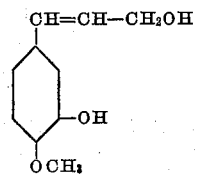

can be obtained. Operating in a similar manner, 3-ethoxy-4-hydroxy cinnamyl alcohol having the formula:

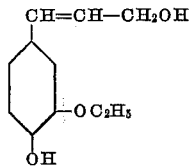

can be obtained from ethyl vanillin (3-ethoxy-4-hydroxybenzaldehyde).

As described above, when the lithium salt A is treated with water alone, a second and different salt which can be designated as lithium salt B is formed. When this lithium salt B is reacted with a carboxylic acid anhydride, an ester of the nuclear-substituted alcohol, derived by the reduction of its corresponding nuclear-substituted cinnamic acid ester, is obtained. The following example illustrates this variation of the process of our invention:

*Example III.—Coniferyl benzoate*

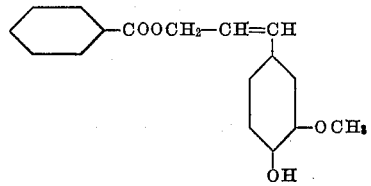

The yellow precipitate of lithium salt A obtained as described in Example II by the reduction of ethyl 4-acetoxy-3-methoxycinnamate with lithium aluminum hydride was decomposed by the addition of 20 parts of water alone. The solid became canary yellow upon addition of the water. It was filtered off, rinsed with dry ethanol, and then dried. The dry salt was then heated in a steam bath with a 50% excess of benzoic anhydride for 30 minutes. The melt was then steam-distilled to remove the excess benzoic acid (and any ethyl benzoate which might be present due to residual ethanol). The coniferyl benzoate crystallized from the residual solution on cooling and the crystals were filtered off and recrystallized from ether, although methanol was likewise useful. A 51% yield of crystals melting at 70–71° C. was obtained.

By replacing benzoic anhydride in the above example with a molecularly equivalent amount of phenylacetic anhydride or acetic anhydride, other esters of coniferyl alcohol can be prepared. In a similar manner when the lithium salt of coniferyl alcohol is replaced by an equivalent amount of the lithium salt of 3,4-dihydroxy-cinnamyl alcohol, 3,4-dihydroxycinnamyl benzoate having the formula:

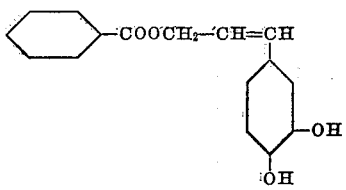

can be obtained. In like manner when a molecularly equivalent amount of the lithium salt of 3,4-methylenedioxycinnamyl alcohol is reacted with a molecularly equivalent amount of acetic anhydride according to the process of Example III, 3,4-methylenedioxycinnamyl acetate having the formula:

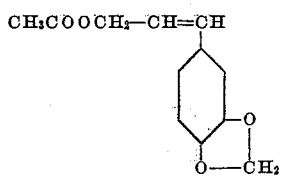

can be obtained.

By substituting molecularly equivalent amounts of other nuclear-substituted cinnamyl alcohol lithium salts and other organic carboxylic acid anhydrides in Example III, still other esters can be prepared.

Many of the esters of the nuclear-substituted cinnamyl alcohols prepared in accordance with the process of our invention are useful as antioxidants. Moreover, many of these esters can be made to polymerize readily in the presence of acidic reagents.

What we claim as our invention and desire to secure by Letters Patent of the United States is:

1. A process for preparing an ester of a derivative of cinnamyl alcohol having a formula selected from the group consisting of those represented by the following two formulas:

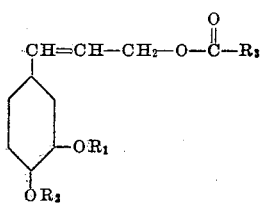

and

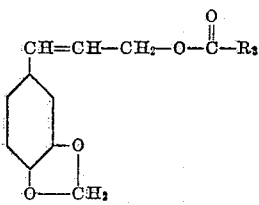

wherein $R_1$ and $R_2$ each represents a substituent selected from the group consisting of a methyl radical, an ethyl radical and an acetyl radical, and $R_3$ represents a substituent selected from the group consisting of an alkyl group containing from 1 to 4 carbon atoms, a monocyclic aryl group of the benzene series containing from 6 to 9 carbon atoms, and a monocyclic aralkyl group containing from 7 to 10 carbon atoms, which comprises selectively reducing a derivative of cinnamic acid selected from the group consisting of those represented by the following two formulas:

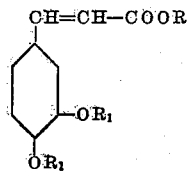

and

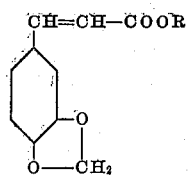

wherein R represents an alkyl group containing from 1 to 4 carbon atoms and $R_1$ and $R_2$ are defined above, with lithium aluminum hydride under substantially anhydrous conditions in the presence of an inert atmosphere, thereafter adding water to the reaction mixture to form a lithium salt of a derivative of cinnamyl alcohol, and acylating this salt with an acid anhydride having the formula:

$$(R_3-CO)_2O$$

wherein $R_3$ is defined above.

2. A process as defined in claim 1 wherein the derivative of cinnamic acid is selectively reduced in the presence of an inert organic solvent.

3. A process as defined in claim 2 wherein the lithium salt of the derivative of cinnamyl alcohol is dried prior to the acylation thereof.

4. A process as defined in claim 3 wherein the inert organic solvent is substantially anhydrous ethyl ether.

5. A process for preparing coniferyl benzoate which comprises selectively reducing ethyl 4-acetoxy-3-methoxy cinnamate with lithium aluminum hydride under substantially anhydrous conditions in the presence of an inert atmosphere, thereafter adding water to the reaction mixture to form a lithium salt of coniferyl alcohol, and acylating this salt with benzoic acid anhydride.

6. A process as described in claim 5 wherein the ethyl 4-acetoxy-3-methoxy cinnamate is selectively reduced in the presence of an inert organic solvent.

7. A process as defined in claim 6 wherein the lithium salt of coniferyl alcohol is dried prior to acylation thereof.

8. A process as defined in claim 7 wherein the inert organic solvent is substantially anhydrous ethyl ether.

9. A process for preparing coniferyl phenylacetate which comprises selectively reducing ethyl 4-acetoxy-3-methoxy cinnamate with lithium aluminum hydride under substantially anhydrous conditions and in the presence of an inert atmosphere, thereafter adding water to the reaction mixture to form a lithium salt of coniferyl alcohol, and acylating this salt with phenylacetic acid anhydride.

10. A process as defined in claim 9 wherein the ethyl 4-acetoxy-3-methoxy cinnamate is selectively reduced in the presence of an inert organic solvent.

11. A process as defined in claim 10 wherein the lithium salt of conferyl alcohol is dried prior to acylation.

12. A process as defined in claim 11 wherein the inert organic solvent is substantially anhydrous ethyl ether.

13. A process for preparing coniferyl acetate which comprises selectively reducing ethyl 4-acetoxy-3-methoxy cinnamate with lithium aluminum hydride under substantially anhydrous conditions in the presence of an inert atmosphere, thereafter adding water to the reaction mixture to form a lithium salt of coniferyl alcohol, and acylating this salt with acetic acid anhydride.

14. A process as defined in claim 13 wherein the ethyl 4-acetoxy-3-methoxy cinnamate is selectively reduced in the presence of an inert organic solvent.

15. A process as defined in claim 14 wherein the lithium salt of coniferyl alcohol is dried prior to the acylation thereof with acetic acid anhydride.

16. A process as defined in claim 15 wherein the inert organic solvent is substantially anhydrous ethyl ether.

17. A process for preparing 3,4-dihydroxycinnamyl benzoate which comprises selectively reducing methyl 3,4-diacetoxycinnamate with lithium aluminum hydride under substantially anhydrous conditions in the presence of an inert atmosphere, thereafter adding water to the reaction mixture to form a lithium salt of 3,4-dihydroxycinnamyl alcohol, and acylating this salt with benzoic acid anhydride.

18. A process as defined in claim 17 wherein the methyl 3,4-diacetoxycinnamate is selectively reduced in the presence of an inert organic solvent.

19. A process as defined in claim 18 wherein the lithium salt of 3,4-dihydroxycinnamyl alcohol is dried prior to acylation thereof.

20. A process as defined in claim 19 wherein the inert organic solvent is substantially anhydrous diethyl ether.

21. A process for preparing 3,4-methylenedioxycinnamyl acetate which comprises selectively reducing ethyl 3,4-methylene-dioxycinnamate with lithium aluminum hydride under substantially anhydrous conditions in the presence of an inert atmosphere, thereafter adding water to the reaction mixture to form a lithium salt of 3,4-methylenedioxycinnamyl alcohol, and acylating this salt with acetic acid anhydride.

22. A process as defined in claim 21 wherein the ethyl 3,4-methylenedioxycinnamate is selectively reduced in the presence of an inert organic solvent.

23. A process as defined in claim 22 wherein the lithium salt of 3,4-methylenedioxycinnamyl alcohol is dried prior to acylation thereof.

24. A process as defined in claim 23 wherein the inert organic solvent is substantially anhydrous ethyl ether.

References Cited in the file of this patent

UNITED STATES PATENTS

| Number | Name | Date |
| --- | --- | --- |
| 2,545,439 | Allen et al. | Mar. 20, 1951 |